May 24, 1932.  E. B. BROTHERTON  1,859,286
RUMBLE SEAT PROTECTOR
Filed Nov. 16, 1931

Inventor
Edward B. Brotherton
By Wooster & Davis
Attorneys

Patented May 24, 1932

1,859,286

UNITED STATES PATENT OFFICE

EDWARD B. BROTHERTON, OF MILFORD, CONNECTICUT

RUMBLE SEAT PROTECTOR

Application filed November 16, 1931. Serial No. 575,252.

This invention relates to new and useful improvements in vehicle bodies and has particular relation to a rumble seat protector adapted to cover and form a cushion for the front edge of the rumble seat opening of an automobile body when the rumble seat is open or in condition for use.

An object of the invention is to provide a rumble seat protector including a cushion means, preferably covered to harmonize with the covering of the rumble seat cushions, and which is disposed over the front edge of the rumble seat opening when the rumble seat is in open position whereby to give said edge a finished appearance and to protect an occupant of the rumble seat against injury should the automobile be suddenly stopped and the occupant catapulted forwardly against the front edge of the rumble seat opening.

Another object is to provide a movably mounted cushioning means and a connection between said means and the rumble seat whereby as the seat is moved to open position said means is moved into a position over the front edge of the rumble seat opening to give a finished appearance and to protect the occupants of the rumble seat against injury should the automobile be stopped suddenly and the occupants thrown against the front edge of the rumble seat opening.

Other objects and advantages will become apparent from a consideration of the following detailed description taken in connection with the accompanying drawings wherein a satisfactory embodiment of the invention is shown. However, it will be understood that the invention is not limited to the details shown but includes all such variations and modifications as fall within the spirit of the invention and the scope of the appended claims, to which claims reference must be had for a definition of the invention.

Figure 1:
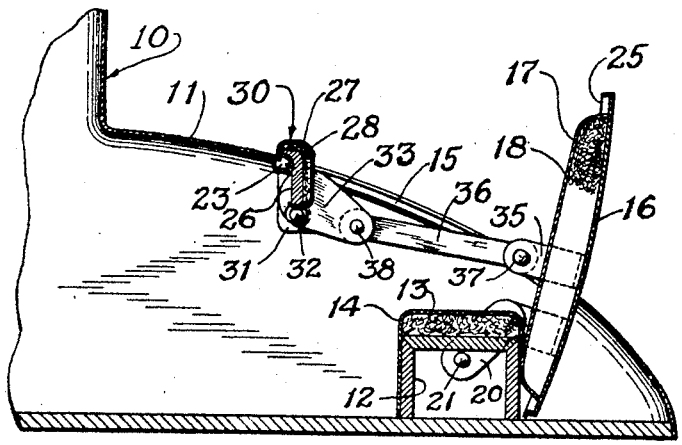
Fig. 1 is a longitudinal sectional view through the rear deck portion of an automobile equipped with a rumble seat, showing the invention in operative position, the rumble seat being open ready for use.
Figure 4:
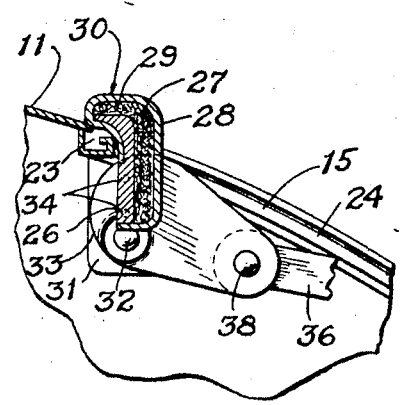
Fig. 4 is a detail sectional view on an enlarged scale showing the protector in active or operative position.

Referring in detail to the drawings, at 10 is generally indicated a portion of an automobile body including a rear deck portion 11 having a rumble seat arrangement built therein. The rumble seat arrangement includes a seat member 12 arranged with the rear portion of the automobile body below the deck 11 and which may have cushioning material 13 applied thereto and enclosed by a suitable covering material 14 usually leather or a leather substitute.

Figure 2:
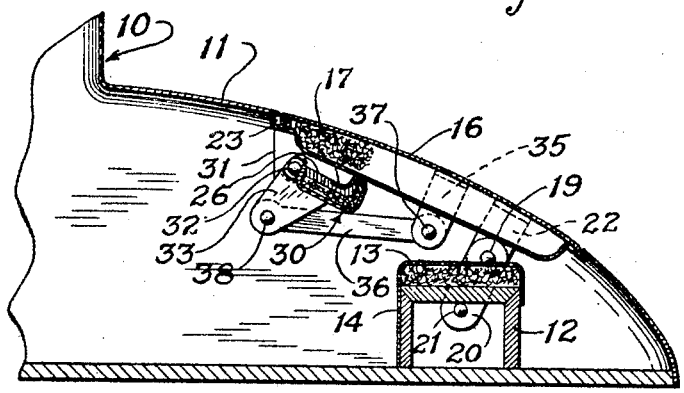
Fig. 2 is a view similar to Fig. 1, the rumble seat being closed and the protector of the present invention being shown as having moved to its inoperative position below the deck of the automobile.
Figure 5:
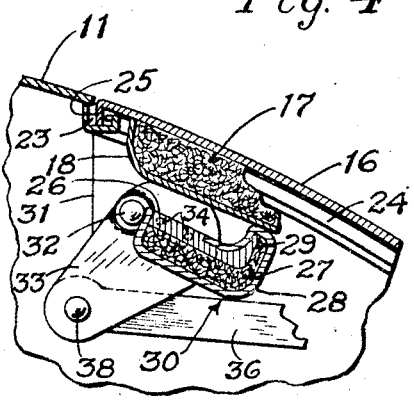
Fig. 5 is a similar view showing the protector in inoperative position.
Figure 3:
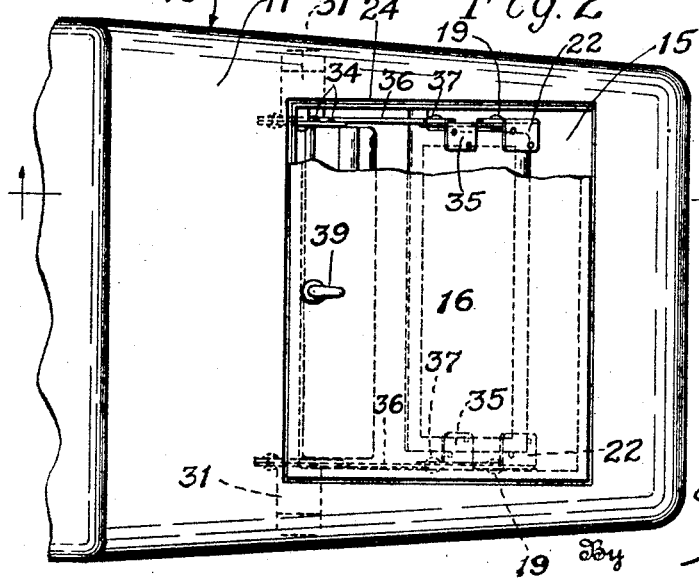
Fig. 3 is a top plan view of the device as shown in Fig. 2, parts being broken away.

Access is had to the seat member 12 through an opening 15 in the deck 11 and when the seat member is not to be used this opening is closed by a back 16 suitably cushioned on one surface as by felt or the like 17 covered as at 18 by leather or a leather substitute corresponding with the covering 14 for the seat member. As will be understood when the rumble seat is not to be used the cover or back 16 occupies a position closing the opening 15 in the deck 11 as shown in Figs. 2, 3 and 5.

When the rumble seat is to be used the combined cover and back 16 is swung to open position as shown in Fig. 1 wherein it is disposed in the rear of the seat member 12 to provide a back rest for the occupant or occupants of the seat member. In order that the combined cover and back may be shifted from one position to the other as indicated it may be pivotally secured as at 19 to one end of a link 20 the link in turn being pivotally mounted as at 21. A bracket 22 may form the connection of the combined back and cover with the pivot 19. While but one pivotal mounting has been described it will, of course, be understood that the described arrangement is duplicated at each side or end of the combined seat and back 16. Any suitable mounting for the rumble seat back so that it can be shifted to either the open or closed position may be used.

Ordinarily channels 23 and 24 are provided along the front and side edges respectively of the opening 15 in the deck and the combined back and cover 16 has its edges flanged as at 25 to enter these channels when in position closing the opening 15 whereby to exclude rain. The present invention is concerned principally with the front edge of the opening 15 which edge is defined by the channel 23. It will be noted that the edge is simply formed of a heavy gauge sheet metal and is not finished. Further, it will be noted that the edge is not in any wise cushioned and it not infrequently happens that children and sometimes adults are injured by being thrown against this edge on the automobile being stopped suddenly. In the case of children being catapulated against the front edge of the opening 15 they are likely to have their faces cut.

According to the present invention means are provided for covering and finishing or forming a cushion over the front edge of the opening 15 when the combined back and cover 16 is moved to open position as shown in Fig. 1. This means comprises a bar 26 arranged transversely of the body 10 and having a suitable cushioning material 27 applied thereto and covered as at 28 by a leather or leather-like material corresponding with the coverings of the back and seat cushions. It will be noted that one edge portion of the bar 26 extends laterally of the bar as at 29 whereby the protector generally designated 30 will extend over the channel 23 at the front edge of the opening 15 to fully cover said channel.

Figure 6:
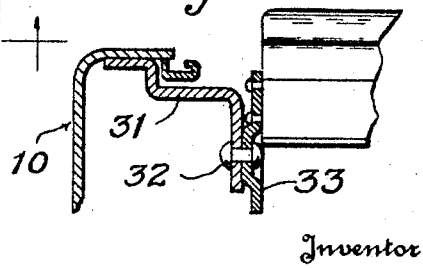
Fig. 6 is a detailed sectional view taken at right angles to Figs. 4 and 5 and showing one of the mounting brackets for the protector.

This bar may be mounted by different means but in that shown, to the underside of the deck 10 at each side edge of the opening 15 (see Fig. 6) there is secured a bracket 31 and to each of these brackets there is pivotally secured as at 32 an arm 33. The arms 33 and their pivots 32 are, of course, arranged opposite one another and the pivots should be arranged in alignment. Protector 30 is rigidly secured to the arms 33 as by screws or the like 34 whereby as the arms are swung on their pivots the protector will be carried with the arms. From an inspection of Figs. 1 and 2 and Figs. 4 and 5 it will be apparent that the arms 33 are adapted to be moved on their pivots to shift the protector from a position below the deck 11 when the combined cover and back 16 is closed to a position over the forward edge and the channel 23 of the opening 15 when the combined cover and back is open.

To this end brackets 35 are secured to the member 16. A link 36 is pivoted at one end to each of the brackets 35 as at 37, it being understood that one link is arranged at each end of the member 16. The other ends of the links 36 are pivotally secured as at 38 to the end portions of the arms 33, the pivotal connections of the links 36 with the arms 33 being at points remote from the mounting pivots 32 for said arms.

From the foregoing it will be seen that the combined seat and back member 16 is at each of its ends connected with the respective ends of the protector 30. If desired the member 16 may be provided with a handle 39 for ease of manipulation. Owing to the connection described between the member 16 and the protector 30, the protector will be moved about the pivot 32 as the member 16 is moved to open the rumble seat for use or to close it when not in use.

As the seat is opened for use the protector is shifted from a position below the deck as shown in Figs. 2 and 5 to a position overlying or covering the front edge of the rumble seat opening 15. This last position of the protector is clearly illustrated in Figs. 1 and 4 and it will be noted that the front edge of the opening 15 is thoroughly cushioned or padded by the protector when the rumble seat is ready for use. Additionally, this protector gives a finished appearance since the covering of the protector may correspond with the covering for the seat member 12 and the back cushion. As the member 16 is moved from its open position to a position covering or closing the opening 15 the arms 33 will have their pivotal connections with the links 38 thrown downwardly whereby to move the arms into the positions illustrated in Figs. 2 and 5 with the protector 30 arranged below the deck 11.

Having thus set forth the nature of my invention, what I claim is:

1. In a vehicle body including a rumble seat arrangement, a cushion means movably mounted within the vehicle and a connection between said means and the back of the rumble seat whereby as the back is moved and the rumble seat opened for use the cushion is moved into a position over the front edge of the rumble seat opening.

2. In a vehicle including a deck portion having a rumble seat arrangement comprising an opening in said deck portion, a seat member below said opening, a back for said seat member, and said back shiftable from a closed position over said opening in the deck to an open position in the rear of said seat member and forming a back rest when the arrangement is ready for use, a covering for the front edge of said opening in the deck, said covering shiftable from an inoperative position below said deck when the back is in closed position to an operative position over the front edge of the deck opening when the back is in open position, and a connection between the back and covering whereby as the back is shifted to open and closed positions the covering is shifted to operative and inoperative positions.

3. In a vehicle including a deck portion having a rumble seat arrangement comprising an opening in said deck portion, a seat member below said opening, a back for said seat member, and said back shiftable from a closed position over said opening in the deck to an open position in the rear of said seat member and forming a back rest when the arrangement is ready for use, a covering for the front edge of said opening in the deck, said covering shiftable from an inoperative position below said deck when the back is in closed position to an operative position over the front edge of the deck opening when the back is in open position, a connection between the back and covering whereby as the back is shifted to open and closed positions the covering is shifted to operative and inoperative positions, and said covering of a material to provide a cushion protection and to give a finished appearance to the opening in the deck.

4. In a vehicle body including a deck portion having a rumble seat arrangement comprising an opening in said deck portion, a seat member below said opening, a back for said seat member, and said back shiftable between a closed position over said opening in the deck and an open position in the rear of the seat member and forming a back rest, a cushion means for the front edge of said opening in the deck, said cushion means shiftable between an inoperative position below said deck when the back is in closed position and an operative position over the front edge of the deck opening when the back is in open position, and a connection between the back and cushion means whereby as the back is shifted to open and closed positions the cushion means is shifted to operative and inoperative positions.

5. In a vehicle body including a deck portion having a rumble seat arrangement comprising an opening in said deck portion, a seat member below said opening, a back for said seat member, and said back shiftable between a closed position over said opening in the deck and an open position in the rear of the seat member, a cushion means for the front edge of said opening in the deck, means pivotally mounting said cushion means whereby the same is shiftable between an inoperative position below the deck when the back is in closed position and an operative position over the front edge of the deck opening when the back is in open position, and a link pivotally connected at one end with said cushion means and at its other end with said back whereby as the back is shifted to open and closed positions the cushion means is shifted to operative and inoperative positions.

In testimony whereof I affix my signature.

EDWARD B. BROTHERTON.